(12) United States Patent
Ernst et al.

(10) Patent No.: US 10,400,652 B2
(45) Date of Patent: Sep. 3, 2019

(54) WASTE HEAT RECOVERY ARCHITECTURE FOR OPPOSED-PISTON ENGINES

(71) Applicant: Cummins Inc., Columbus, IN (US)

(72) Inventors: Timothy C. Ernst, Columbus, IN (US);
J. Steven Kolhouse, Columbus, IN (US); Bhanu Teja Krishnavajjala, Columbus, IN (US)

(73) Assignee: Cummins Inc., Columbus, IN (US)

( * ) Notice: Subject to any disclaimer, the term of this patent is extended or adjusted under 35 U.S.C. 154(b) by 184 days.

(21) Appl. No.: 15/611,469

(22) Filed: Jun. 1, 2017

(65) Prior Publication Data

US 2017/0356321 A1    Dec. 14, 2017

Related U.S. Application Data

(60) Provisional application No. 62/347,884, filed on Jun. 9, 2016.

(51) Int. Cl.
| | |
|---|---|
| *F01N 5/02* | (2006.01) |
| *F02M 26/32* | (2016.01) |
| *F01N 13/10* | (2010.01) |
| *F02G 5/04* | (2006.01) |
| *F01P 3/20* | (2006.01) |
| *F01P 7/14* | (2006.01) |

(52) U.S. Cl.
CPC .............. *F01N 5/02* (2013.01); *F01N 13/10* (2013.01); *F01P 3/20* (2013.01); *F01P 7/14* (2013.01); *F02G 5/04* (2013.01); *F02M 26/32* (2016.02); *F01P 2007/146* (2013.01); *F02G 2260/00* (2013.01); *Y02T 10/16* (2013.01)

(58) Field of Classification Search
CPC ........ F01K 23/02; F01K 23/065; F01K 25/10; F02G 5/04; F01N 5/02; F01N 3/10; F01N 13/10

See application file for complete search history.

(56) References Cited

U.S. PATENT DOCUMENTS

| | | | |
|---|---|---|---|
| 2,502,878 A | 4/1950 | Newcombe | |
| 4,901,531 A * | 2/1990 | Kubo | F01K 23/065 60/618 |
| 5,058,537 A * | 10/1991 | Paul | F01B 7/14 123/193.6 |

(Continued)

*Primary Examiner* — Mark A Laurenzi
*Assistant Examiner* — Shafiq Mian
(74) *Attorney, Agent, or Firm* — Foley & Lardner LLP (57) ABSTRACT

A system includes an exhaust passage and a waste heat recovery system. The exhaust passage is structured to fluidly couple to an exhaust manifold of an engine, and to receive exhaust gas from the engine. The waste heat recovery system includes a working fluid circuit, a superheater, and an expander. The working fluid circuit includes a pump to circulate a working fluid through the working fluid circuit, including through the engine. Heat is transferred from the engine to the working fluid. The superheater is positioned along the working fluid circuit downstream of the engine. The superheater is fluidly coupled to the exhaust passage and transfers heat from the exhaust gas to the working fluid. The expander is positioned along the working fluid circuit downstream of the superheater. The expander generates useful energy from the heat transferred to the working fluid from the exhaust gas and the engine.

17 Claims, 6 Drawing Sheets

(56) References Cited

U.S. PATENT DOCUMENTS

| | | | | |
|---|---|---|---|---|
| 5,431,130 | A * | 7/1995 | Brackett | F01B 9/023 123/190.2 |
| 6,418,885 | B1 * | 7/2002 | Paul | F02D 19/081 123/25 C |
| 6,986,251 | B2 * | 1/2006 | Radcliff | F01K 23/065 60/646 |
| 7,797,940 | B2 * | 9/2010 | Kaplan | F01K 25/08 60/641.2 |
| 8,464,671 | B2 * | 6/2013 | Zhou | F01B 9/042 123/197.1 |
| 8,528,333 | B2 * | 9/2013 | Juchymenko | F01K 23/065 60/618 |
| 8,683,801 | B2 * | 4/2014 | Ernst | F01K 23/065 60/615 |
| 8,925,318 | B2 * | 1/2015 | Seo | F01K 23/065 60/618 |
| 9,097,143 | B2 * | 8/2015 | Smith | F01K 7/02 |
| 9,097,178 | B2 * | 8/2015 | Tour | F02B 33/18 |
| 9,897,103 | B2 * | 2/2018 | Kamiya | F04C 23/006 |
| 9,902,235 | B2 * | 2/2018 | Tanda | B60H 1/00921 |
| 2009/0320477 | A1 * | 12/2009 | Juchymenko | F01K 23/065 60/651 |
| 2013/0139507 | A1 | 6/2013 | Morse | |
| 2013/0247877 | A1 | 9/2013 | Waggott | |
| 2014/0116050 | A1 * | 5/2014 | Seo | F01K 23/065 60/659 |
| 2015/0114372 | A1 | 4/2015 | Cobb | |
| 2015/0275698 | A1 * | 10/2015 | Kawai | F02G 5/02 60/604 |

* cited by examiner

WASTE HEAT RECOVERY ARCHITECTURE FOR OPPOSED-PISTON ENGINES

CROSS-REFERENCE TO RELATED APPLICATIONS

The present application claims priority to U.S. Provisional Patent Application No. 62/347,884, filed Jun. 9, 2016 and the contents of which are incorporated herein by reference in the entirety.

TECHNICAL FIELD

The present disclosure relates generally to the field of cooling systems for internal combustion engine systems.

BACKGROUND

A two-stroke engine is an internal combustion engine that completes a power cycle with a single complete rotation of a crankshaft and two strokes of a piston connected to the crankshaft. The strokes are typically denoted as compression and power strokes. One example of a two-stroke cycle engine is an opposed-piston engine in which two pistons are disposed in a bore of a cylinder for reciprocating movement in opposing directions along a central axis of the cylinder.

In operation, internal combustion engines, such as opposed-piston engines, discharge heat energy into the external environment through exhaust gas, engine cooling systems, charge air cooling systems, etc. The discharged heat energy that is not used to perform useful work is typically known as "waste heat." Waste heat recovery ("WHR") systems capture a portion of the waste heat to perform useful work, such as generating electrical energy via an expander (e.g., a turbine). Some WHR systems utilize a Rankine cycle ("RC"). The RC is a thermodynamic process in which heat is transferred to a working fluid in an RC circuit. The working fluid is pumped to a boiler where it is vaporized. The vapor is passed through an expander and then through a condenser, where the vapor is condensed back to a fluid. The expander may drive a generator to generate electrical energy. An Organic Rankine cycle ("ORC") is an RC in which the working fluid is an organic, high molecular mass fluid with a liquid-vapor phase change at a lower temperature than that of water. Such a fluid enables heat recovery from relatively lower temperature sources relative to other RC systems.

SUMMARY

In an embodiment, a system includes an exhaust passage, an engine cooling circuit, and a waste heat recovery system. The exhaust passage is structured to fluidly couple to an exhaust manifold of an opposed-piston engine, the exhaust passage is structured to receive exhaust gas from the engine. The engine cooling circuit includes a first pump structured to circulate an engine cooling fluid through the engine and through a first boiler positioned downstream of the engine. The waste heat recovery system includes a working fluid circuit, the first boiler, a superheater, and an expander. The working fluid circuit includes a second pump structured to circulate a working fluid through the working fluid circuit. The first boiler is positioned along the working fluid circuit, and the first boiler is structured to transfer heat from the engine cooling fluid to the working fluid. The superheater is positioned along the working fluid circuit downstream of the first boiler. The superheater is fluidly coupled to the exhaust passage and is structured to transfer heat from the exhaust gas to the working fluid. The expander is positioned along the working fluid circuit downstream of the superheater. The expander is structured to generate useful energy from the heat transferred to the working fluid from each of the exhaust gas and the engine cooling fluid.

In another embodiment, a system includes an exhaust passage and a waste heat recovery system. The exhaust passage is structured to fluidly couple to an exhaust manifold of an opposed-piston engine, and the exhaust passage is structured to receive exhaust gas from the engine. The waste heat recovery system includes a working fluid circuit, a superheater, and an expander. The working fluid circuit includes a pump structured to circulate a working fluid through the working fluid circuit, including through the engine, wherein, in operation, heat is transferred from the engine to the working fluid. The superheater is positioned along the working fluid circuit downstream of the engine. The superheater is fluidly coupled to the exhaust passage and is structured to transfer heat from the exhaust gas to the working fluid. The expander is positioned along the working fluid circuit downstream of the superheater. The expander is structured to generate useful energy from the heat transferred to the working fluid from each of the exhaust gas and the engine.

In another embodiment, a system includes an engine cooling system. An engine cooling circuit of the engine cooling system includes a first pump structured to circulate an engine cooling fluid through an opposed-piston engine. A first boiler is positioned along the engine cooling circuit downstream of the engine. A radiator is positioned along the engine cooling circuit downstream of the engine. A three-way valve is positioned downstream of the engine and upstream of each of the first boiler and the radiator. The first valve is structured to block flow of the engine cooling fluid through the radiator in response to a temperature of the engine cooling fluid downstream of the engine being below a predetermined value. A waste heat recovery system includes a working fluid circuit. The working fluid circuit includes a second pump structured to circulate a working fluid through the working fluid circuit. The first boiler is positioned along the working fluid circuit and is structured to transfer heat from the engine cooling fluid to the working fluid.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that the figures are representations for purposes of illustration. The figures are provided for the purpose of illustrating one or more implementations with the explicit understanding that they will not be used to limit the scope or the meaning of the claims.

DETAILED DESCRIPTION

Engine cooling systems operate to ensure that temperatures of certain engine components do not exceed rated operating temperature limits. Conventionally, heat may be extracted from the piston via coolant fluid that is circulated through the engine, and heat is removed from the coolant via a radiator.

Referring generally to the figures, various embodiments relate to a cooling system for cooling an opposed-piston engine. The cooling system includes a WHR system that is structured to extract heat from both the engine exhaust and from the engine itself. According to various embodiments, heat may be extracted from the engine indirectly or directly. For example, in embodiments that utilize indirect engine heat extraction, the WHR system may include a first boiler structured to transmit heat from an engine cooling fluid to a working fluid of the WHR system; the WHR system may also include at least one of a boiler and a superheater structured to also transmit heat from the exhaust gas to the working fluid. In embodiments utilizing direct engine heat extraction, the working fluid of the WHR system may be pumped directly through the engine so that heat is transferred from the engine to the working fluid; the WHR system may also include at least one of a boiler and a superheater structured to also transmit heat from the exhaust gas to the working fluid.

By way of comparison, "single piston" engines (having a single piston per cylinder) generally include a cylinder head incorporating one or more cylinders, and each cylinder may include actuated valves which may be integral to the cylinder head. Opposed-piston engines, however, do not have a cylinder head, and instead, each cylinder includes two pistons, one opposite the other. In operation of a single piston engine, a significant amount of energy is transferred through the cylinder head at a "flame deck" to the coolant passages located within the cylinder head, and some of the cylinder heat is conducted directly to areas of the cylinder head due to the close proximity and physical contact of the cylinder head with the cylinder liner. Because opposed-piston engines do not have a cylinder head, there is a high concentration of heat at a location near where both pistons approach each other at top dead center ("TDC"). Without the cylinder head in this location, the heat is transferred entirely through the cylinder liner to cooling jackets around the cylinder liner to keep this area sufficiently cool. The instant cooling system, according to various embodiments, facilitates removal of heat through the cylinder liner in various ways, such as (1) transferring the cylinder heat through cooling using a typical coolant (e.g., an ethylene glycol/water solution), then performing a heat transfer from the coolant to a working fluid of an organic Rankine cycle ("ORC"); (2) transferring the cylinder heat to a heat transfer oil and then to the working fluid of the ORC; or (3) transferring the cylinder heat directly to the working fluid of the ORC.

Additionally, two-stroke engines tend to have a high charge flow (air plus EGR) due to the amount of charge air needed for combustion and due to the additional need for scavenging (clearing the exhaust gases out of the cylinder when both the intake and exhaust passages related to the cylinder are open). The high charge flow necessitates additional cooling. Some embodiments include a charge air/EGR cooler in addition to cylinder liner cooling. Accordingly, in some embodiments, the additional heat from the high charge flow requirement is transferred to the ORC via a charge air/EGR cooler and utilized for energy recovery, in addition to the heat transferred through the cylinder liner.

According to various embodiments, the instant cooling system provides enhanced cooling capabilities compared to conventional systems. Accordingly, in certain embodiments, the cooling system is optimized for use with opposed-piston engines. However, it should be understood that the instant cooling system may similarly be used with other types of engines, such as other two-stroke, four-stroke, or other types of engines.

Figure 1:
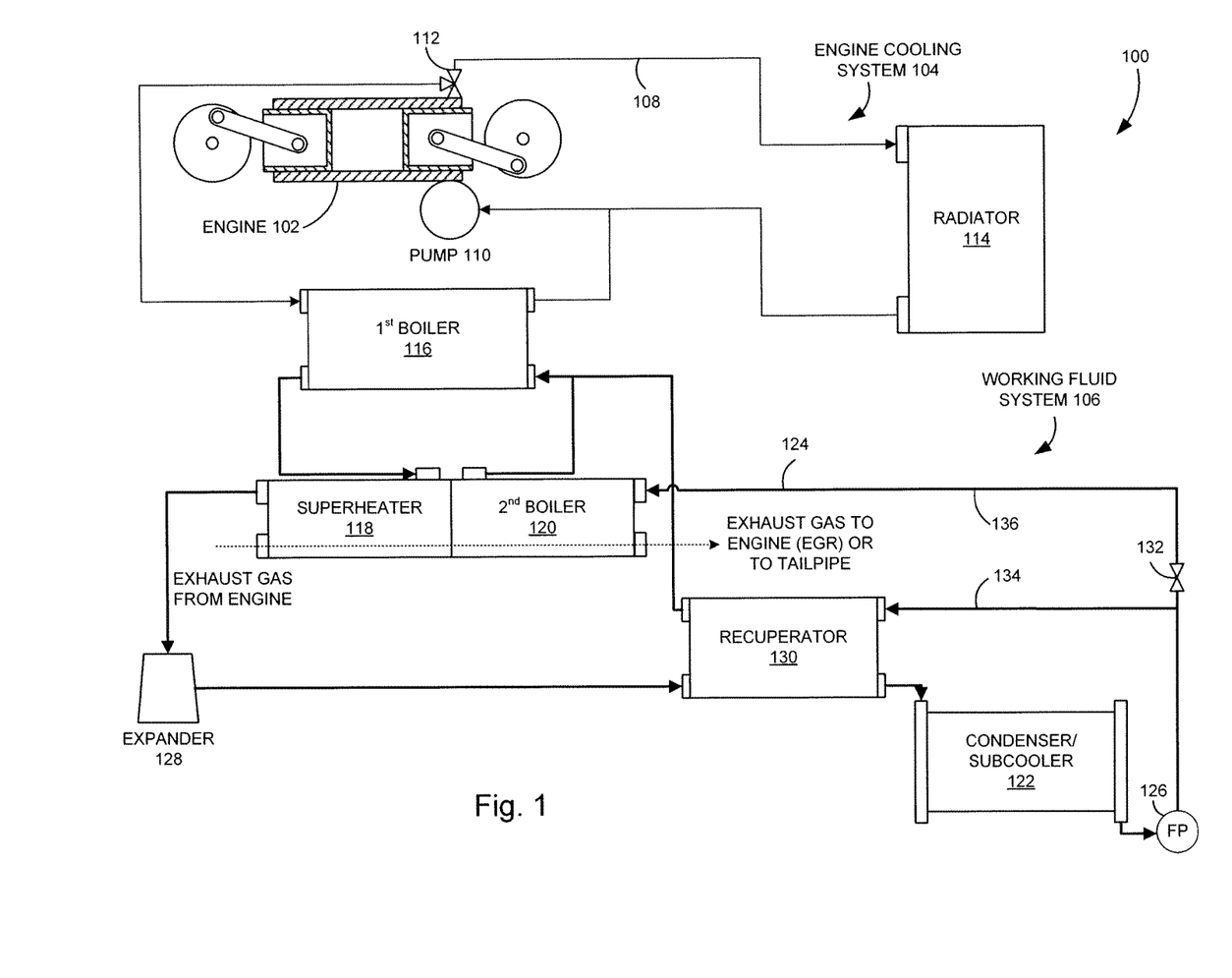
FIG. 1 is a block diagram illustrating an engine system, according to an embodiment.

FIG. 1 is a block diagram illustrating an engine system 100, according to an embodiment. The engine system 100 includes an engine 102, an engine cooling system 104, and a WHR system, referred to as a working fluid system 106, according to an embodiment. In some embodiments, the engine 102 operates as a prime mover for an electric power generator or for a vehicle. In one embodiment, the engine 102 is a two-cycle opposed-piston engine. In other embodiments, the engine 102 is another type of two-cycle or four-cycle engine. The engine 102 may be powered by any of various types of fuels (e.g., diesel, natural gas, gasoline, etc.).

The engine cooling system 104 is structured to provide cooling for the engine 102. According to an embodiment, the engine cooling system 104 includes an engine cooling circuit 108 that defines a flow path for coolant fluid through the engine 102 and other components of the engine cooling system 104. It should be understood that the engine cooling circuit 108 includes conduits (not shown) fluidly coupling the engine 102 and other components of the engine cooling system 104, as well as the fluid passages of the engine 102 and other components of the engine cooling system 104. In some embodiments, the engine coolant fluid includes water. For example, the engine coolant fluid may include pure water or a mixture of water and antifreeze. In other embodiments, the engine coolant fluid is a thermal oil or other type of heat transfer fluid.

The engine cooling system 104 includes a first pump 110 (e.g., water pump) positioned upstream of the engine 102. It should be understood that the terms "upstream" and "downstream," when referring to the engine cooling system 104, refer to the flow direction of the coolant fluid through the engine cooling system 104. The first pump 110 is structured to circulate the coolant fluid through the engine cooling circuit 108. A three-way valve 112 is positioned in the engine cooling circuit 108 downstream of the engine 102. The three-way valve 112 is structured to controllably direct the coolant fluid exiting the engine 102 to one or both of a radiator 114 and a first boiler 116. For example, in one embodiment, the engine cooling system 104 further includes a thermostat (not shown) in operative communication with the three-way valve 112. The thermostat may monitor the temperature of the coolant fluid exiting the engine 102. In some embodiments, the three-way valve 112 is configured to facilitate coolant flow through the first boiler 116 without flowing through the radiator 114 until a predetermined operating temperature is met, after which the three-way valve 112 facilitates coolant flow through one or both of the radiator 114 and the first boiler 116. In some implementations, the predetermined operating temperature is a predefined value stored in memory of a controller (not shown). In other implementations, the predetermined operating temperature is dependent on other system parameters, such as ambient temperature and engine load.

It should be understood that the system 100 also includes an exhaust passage (not shown) fluidly coupled to an exhaust manifold of the engine. The exhaust passage is structured to receive exhaust gas from the engine and expel the exhaust gas to the external environment. In some embodiments, the exhaust passage includes an exhaust gas recirculation passage structured to divert at least a portion of the exhaust gas to an intake manifold of the engine 102.

The working fluid system 106 is structured to convert waste heat produced by the engine 102 into useful energy, such as mechanical and/or electrical energy. More specifically, the working fluid system 106 is structured to convert waste heat from both the exhaust gas and the engine cooling system 104 to useful energy. In some embodiments, the working fluid system 106 is further configured to convert engine waste heat from other sources, such as a charge air cooler or an oil cooler. The working fluid system 106 includes the first boiler 116, a superheater 118, a second boiler 120, and a condenser/subcooler 122 positioned along a working fluid circuit 124. The working fluid circuit 124 includes a second pump 126 (e.g., a feed pump) structured to circulate a working fluid through the various components of the working fluid system 106. The first boiler 116 operates as a heat exchanger to transfer heat energy from the coolant fluid in the engine cooling circuit 108 to the working fluid in the working fluid circuit 124 so as to vaporize the working fluid. The coolant fluid that passes through the first boiler 116 has been heated by the engine 102. Therefore, the first boiler 116 cools the coolant fluid, thereby providing additional cooling to the engine 102. According to various embodiments, the working fluid can include any of various types of fluids, such as, by way of non-limiting examples, a refrigerant (e.g., R245a or other low global warming potential ("GWP") replacements), ethanol, toluene, other hydrocarbon-based working fluids, other hydrofluorocarbon-based working fluids, or water.

The superheater 118 is positioned along the working fluid circuit 124 downstream of the first boiler 116. It should be understood that the terms "upstream" and "downstream," when referring to the working fluid circuit 124, refer to the flow direction of the working fluid through the working fluid circuit 124. The superheater 118 is operatively and fluidly coupled to the exhaust passage of the engine so as to receive hot exhaust gas from the engine. The hot exhaust gas flows through the superheater 118 in a first direction and the vaporized working fluid from the first boiler 116 flows through the superheater 118 in an opposite second direction. Heat energy is transferred to the vaporized working fluid from the hot exhaust gas, thereby further heating the working fluid. For example, the superheater 118 may convert the saturated or "wet" working fluid vapor to "dry" working fluid vapor. In some embodiments, the superheater 118 and the second boiler 120 are positioned in an EGR passage of the exhaust passage. In other embodiments, the superheater 118 and the second boiler 120 are positioned in a tailpipe passage of the exhaust passage. Accordingly, the exhaust gas that flows through the superheater 118 and the second boiler 120 may be directed to the intake of the engine 102 or to the tailpipe, depending on the implementation of the system 100. In some implementations, the superheater 118 may receive waste heat from other sources, such as from engine cooling systems, charge air cooling systems, and other sources, in addition to or instead of from the exhaust gas.

An expander 128 is positioned along the working fluid circuit 124 downstream of the superheater 118 and upstream of the condenser/subcooler 122. As the vaporized working fluid travels through the expander 128, the vapor expands and loses pressure, thereby driving a turbine of the expander 128 to generate useful work. In some embodiments, the turbine of the expander 128 is operatively coupled to a generator, which converts the mechanical energy of the rotating turbine into electrical energy. In other embodiments, the turbine of the expander 128 is operatively coupled to a crankshaft of the engine 102, engine accessories, and/or other components, for example, via a gear or belt drive so as to transfer mechanical energy to those devices. According to various embodiments, the expander 128 may include a piston expander, a screw expander, a scroll expander, a gerotor expander, or other expander.

Optionally, a recuperator 130 is positioned along the working fluid circuit 124 downstream of the expander 128 and upstream of the condenser/subcooler 122. The recuperator 130 is structured to transfer heat energy remaining in the working fluid to the cooled working fluid condensed by the condenser/subcooler 122 so as to pre-heat the working fluid prior to the working fluid entering the first boiler 116. The working fluid flows from the recuperator 130 or from expander 128 to the condenser/subcooler 122, where the working fluid is cooled and condensed back to a liquid, and subsequently is recycled through the working fluid circuit 124.

In some embodiments, a valve 132 is positioned along the working fluid circuit 124 downstream of the condenser/subcooler 122. The valve 132 is structured to selectively direct the working fluid to at least one of a first leg 134 and a second leg 136 of the working fluid circuit 124. The first leg 134 fluidly couples the condenser/subcooler 122 and the recuperator 130. The working fluid flows through the first leg 134 from the condenser/subcooler 122 to the recuperator 130, and subsequently to the first boiler 116. The second leg 136 fluidly couples the condenser/subcooler 122 and the second boiler 120. The working fluid flows through the second leg 136 from the condenser/subcooler 122 to the second boiler 120, and subsequently to the first boiler 116. Accordingly, the valve 132 controls the amount of working fluid that flows through the recuperator 130 and through the second boiler 120.

The second boiler 120 is fluidly coupled to the superheater 118 so as to receive the exhaust gas from the superheater 118. The second boiler 120 is structured to transfer heat from the exhaust gas to the working fluid flowing through the second boiler 120 from the second leg 136 of the working fluid circuit 124 to the first boiler 116. In some embodiments, the superheater 118 and the second boiler 120 are integrated in a single component package. In other embodiments, the superheater 118 and the second boiler 120 are separate discrete components.

Figure 2:
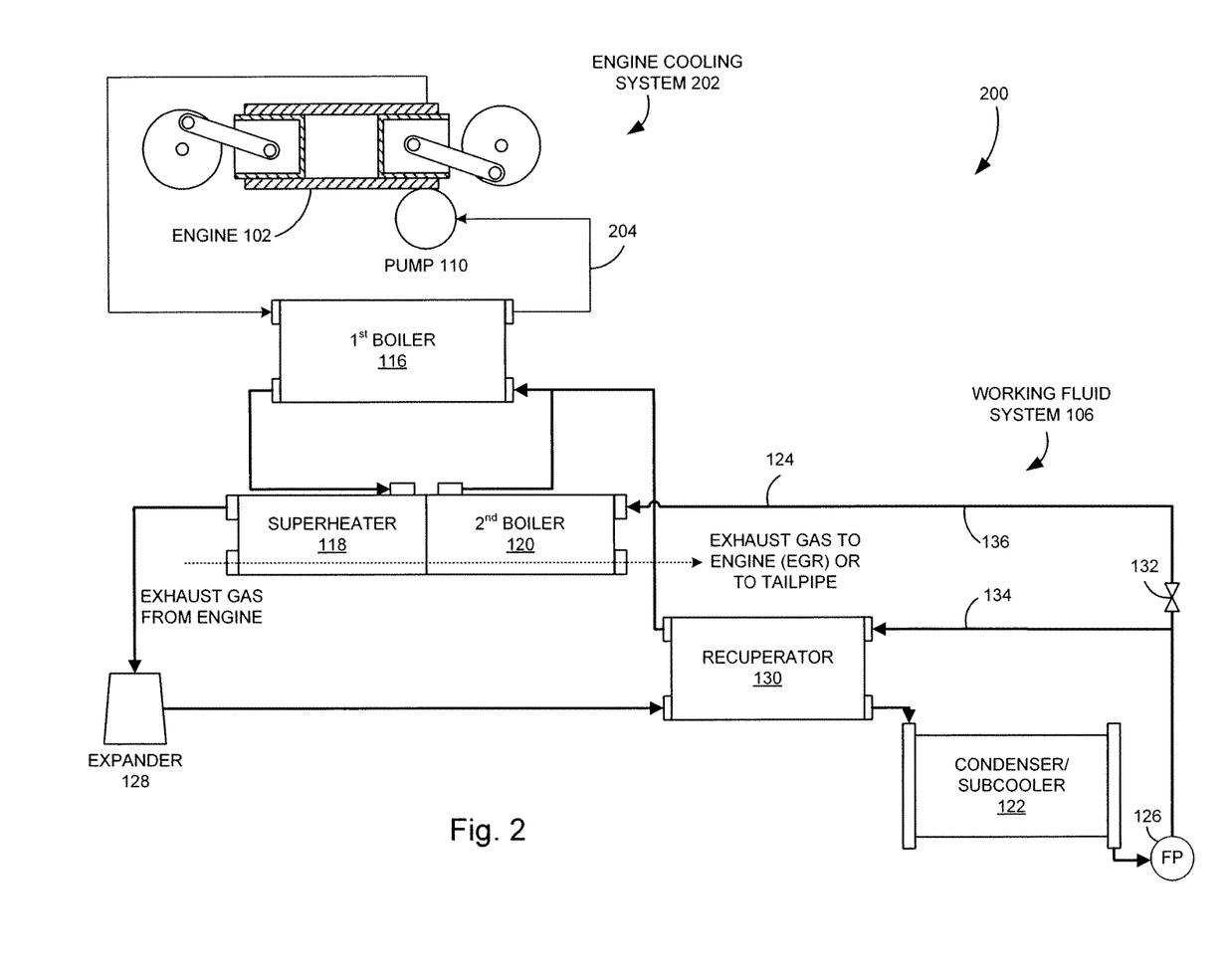
FIG. 2 is a block diagram illustrating an engine system, according to another embodiment.

FIG. 2 is a block diagram illustrating an engine system 200, according to another embodiment. The engine system 200 of FIG. 2 is generally similar to the engine system 100 of FIG. 1, a difference being that an engine cooling system 202 includes a thermal oil circuit 204 including a thermal oil heat transfer fluid, and the radiator 114 of FIG. 1 is not included in the thermal oil circuit 204 of FIG. 2. In some embodiments, the engine cooling system 202 includes the thermal oil circuit 204 in addition to an engine cooling circuit using engine coolant (e.g., the engine cooling circuit 108 of FIG. 1). In some embodiments, the thermal oil heat transfer fluid is utilized in the lubrication system of the engine. In other embodiments, the thermal oil heat transfer fluid is separate from the engine lubricant oil.

Figure 3:
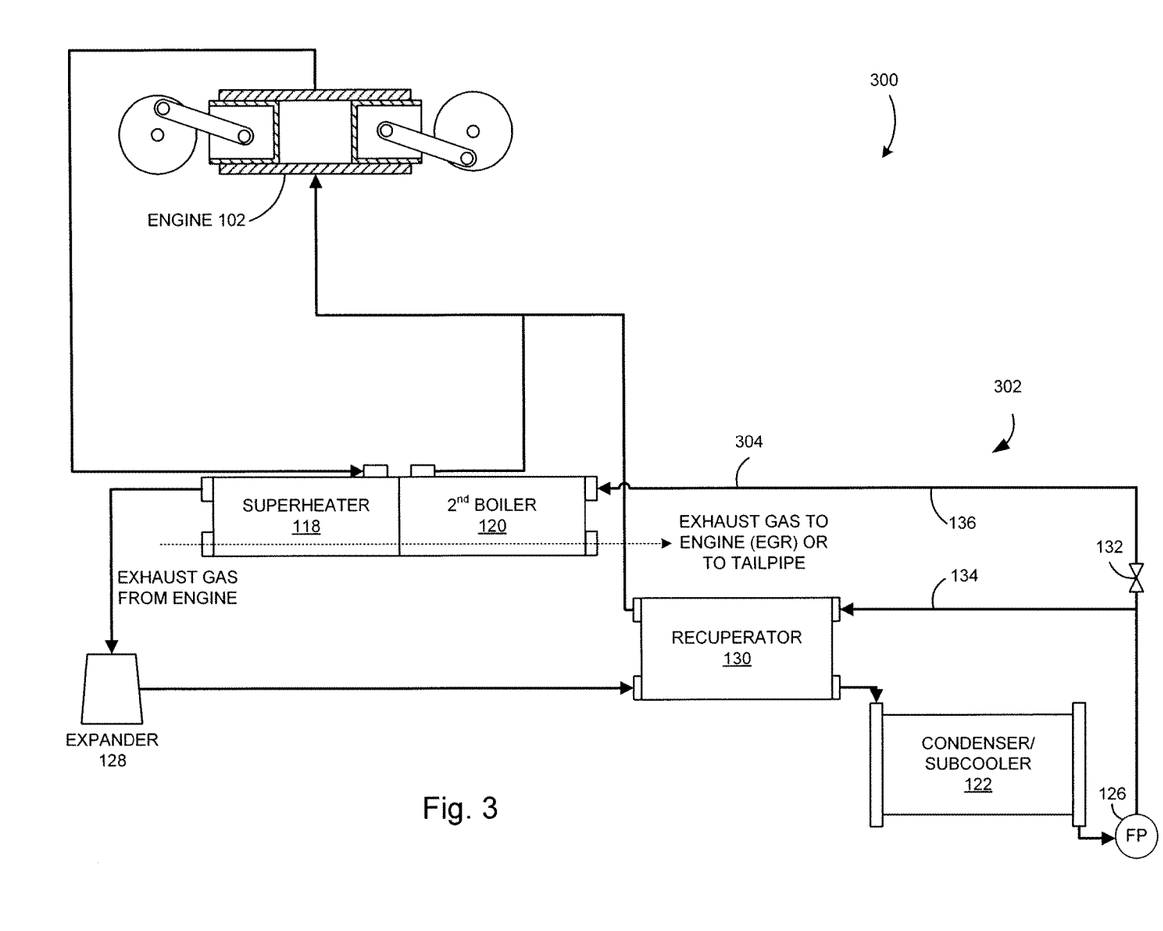
FIG. 3 is a block diagram illustrating an engine system, according to still another embodiment.

FIG. 3 is a block diagram illustrating an engine system 300 according to another embodiment. The engine system 300 of FIG. 3 is generally similar to the engine system 100 of FIG. 1 and the engine system 200 of FIG. 2, with a difference being that a WHR system 302 of FIG. 3 includes a working fluid circuit 304 including a working fluid and omits the engine cooling system 104 (FIG. 1) or the engine cooling system 202 (FIG. 2). The engine system 300 of FIG. 3 utilizes direct engine cooling via the WHR system 302. By way of comparison, the engine systems 100/200 of respective FIGS. 1 and 2 utilize indirect engine cooling in which the respective engine cooling system 104/202 operates to cool the engine 102 and the working fluid system 106 operates to cool the engine cooling system 104.

The working fluid circuit 304 includes the engine 102 such that the working fluid is pumped directly through the engine 102. In one embodiment, the engine 102 includes separate passages to partially define the working fluid circuit 304. The working fluid of the working fluid circuit 304 may be similar to the working fluid of the working fluid circuit 124 of FIGS. 1 and 2.

Figure 4:
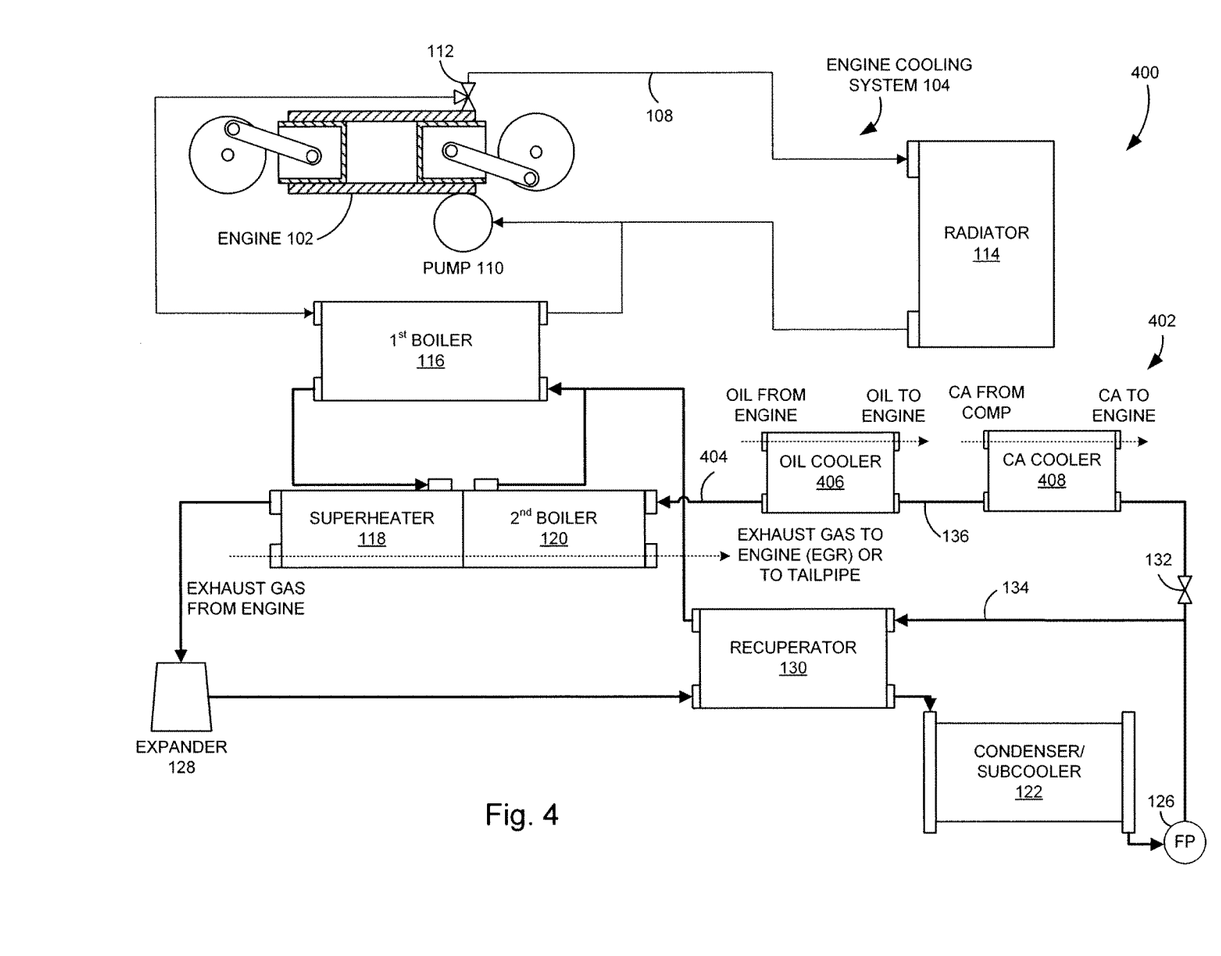
FIG. 4 is a block diagram illustrating an engine system, according to yet another embodiment.

FIG. 4 is a block diagram illustrating an engine system 400 according to another embodiment. The engine system 400 of FIG. 4 is generally similar to the engine system 100 of FIG. 1, with a difference being that a WHR system 402 of FIG. 4 includes a working fluid circuit 404 including an oil cooler 406 and a charge air cooler 408. In an embodiment, the oil cooler 406 is positioned along the working fluid circuit 404 upstream of the second boiler 120. The oil cooler 406 is structured to receive oil from the engine 102 and working fluid from the working fluid circuit 404. Heat energy is transferred from the oil to the working fluid so as to heat the working fluid prior to the working fluid entering the second boiler 120, and to cool the oil before it is circulated back into the engine 102. The charge air cooler 408 is positioned along the working fluid circuit 404 upstream of the oil cooler 406 and downstream of the condenser/subcooler 122. The charge air cooler 408 is structured to receive charge air from a compressor of a turbocharger (not shown) and working fluid from the working fluid circuit 404. Heat energy is transferred from the charge air to the working fluid so as to heat the working fluid prior to the working fluid entering oil cooler 406, and to cool the charge air before the charge air flows into the engine 102. Some embodiments include only one of the oil cooler 406 and the charge air cooler 408. In some embodiments, the oil cooler 406 and the charge air cooler 408 are positioned at different locations along the working fluid circuit 404.

Figure 5:
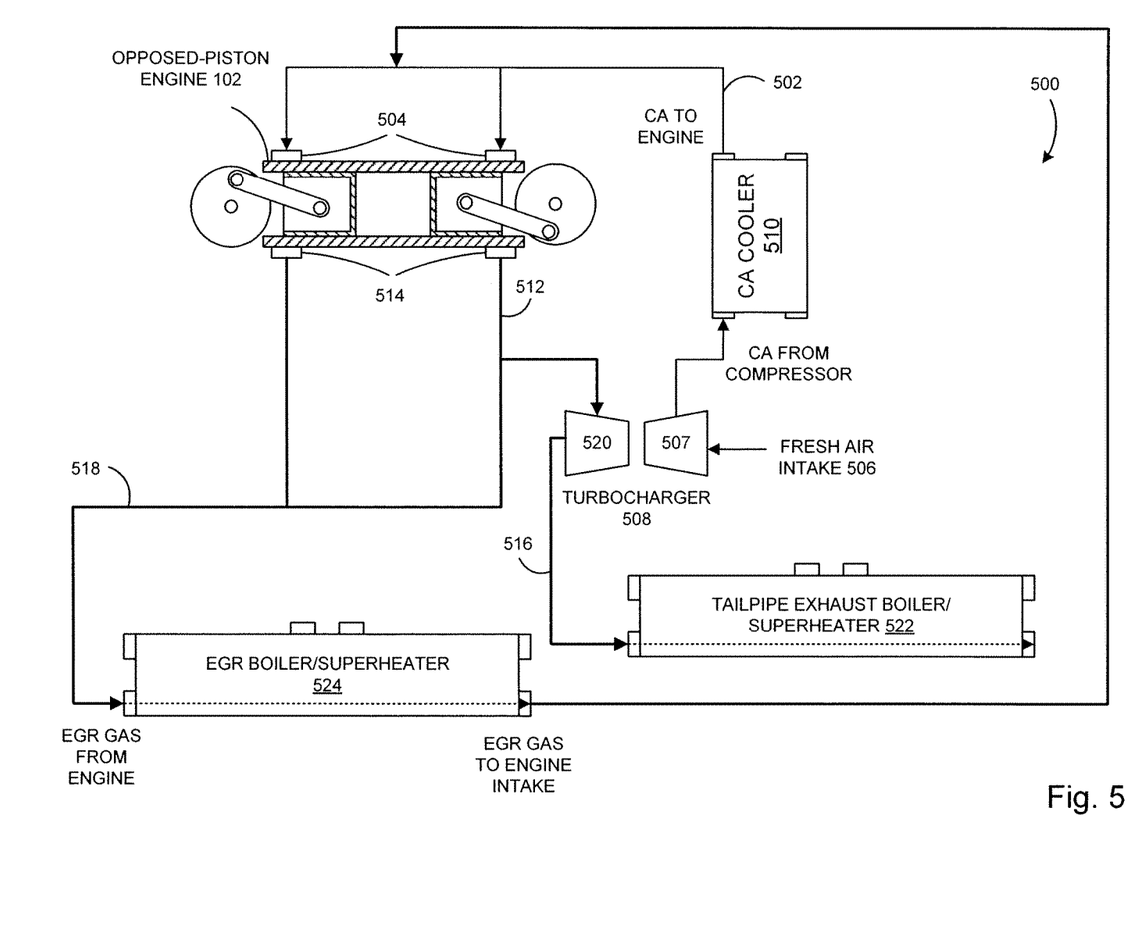
FIG. 5 is a block diagram illustrating exhaust gas and charge air routing of an engine system, according to an embodiment.

FIG. 5 is a block diagram illustrating exhaust gas and charge air routing of an engine system 500, according to an embodiment. The exhaust gas and charge air routing of the engine system 500 of FIG. 5 may be utilized in connection with any of the engine systems 100, 200, 300, and 400 of FIGS. 1-4, or with other engine systems. The engine system 500 includes an intake passage 502 fluidly coupled to an intake manifold 504 of the engine 102. The intake passage 502 supplies air to the engine 102, which is mixed with fuel and provided to the engine for combustion. The intake passage 502 receives air from a fresh air intake 506. In some embodiments, as illustrated in FIG. 5, the fresh air intake 506 is fluidly coupled to a compressor 507 of a turbocharger 508. The compressed charge air flows from the turbocharger 508 to the intake manifold 504 via the intake passage 502. The engine system 500 of FIG. 5 also includes a charge air cooler 510 fluidly coupled to the intake passage 502 between the turbocharger 508 and the intake manifold 504. The charge air cooler 510 is structured to cool the intake air provided to the engine 102. The engine system 500 illustrated in FIG. 5 includes a single-stage turbocharging system. However, in other embodiments, the engine system 500 includes a multi-stage turbocharging and/or supercharging system.

The engine system 500 also includes an exhaust passage 512 fluidly coupled to an exhaust manifold 514 of the engine 102. The exhaust passage 512 includes a tailpipe 516 and an EGR passage 518. The exhaust gas from the engine 102 may selectively be directed to one or both of the tailpipe 516 and the EGR passage 518. The tailpipe 516 is fluidly coupled to a turbine 520 of the turbocharger 508, which is operatively coupled to the compressor 507. The turbine 520 is driven by the pressure and heat of the exhaust gas to drive the compressor 507. In some embodiments, the tailpipe 516 fluidly couples the turbine 520 and a tailpipe exhaust boiler/superheater 522. The tailpipe exhaust boiler/superheater 522 transfers heat from the exhaust gas to a working fluid in a working fluid circuit. For example, the tailpipe exhaust boiler/superheater 522 may include both the superheater 118 and the second boiler 120 of the engine systems 100, 200, 300, and 400 of FIGS. 1-4. The exhaust gas is ultimately expelled from the tailpipe 516 into the external atmosphere.

The EGR passage 518 is structured to direct at least a portion of the exhaust gas from the engine 102 back to the intake manifold 504 of the engine. In some embodiments, the EGR passage 518 fluidly couples the exhaust manifold 504 and an EGR boiler/superheater 524. The EGR boiler/superheater 524 transfers heat from the exhaust gas to a working fluid in a working fluid circuit. For example, the EGR boiler/superheater 524 may include both the superheater 118 and the second boiler 120 of the engine systems 100, 200, 300, and 400 of FIGS. 1-4. The EGR passage 518 directs the EGR exhaust gas from the EGR boiler/superheater 524 to the intake passage 502, through which it is routed to the intake manifold 504 of the engine 502. The EGR passage 518 of the engine system 500 of FIG. 5 defines a high-pressure EGR circuit. However, some embodiments additionally or alternatively include a low-pressure EGR circuit. Some embodiments further include an EGR cooler (not shown) positioned upstream of the intake manifold 504 and structured to cool the EGR gas prior to the EGR gas entering the intake manifold 504.

Figure 6:
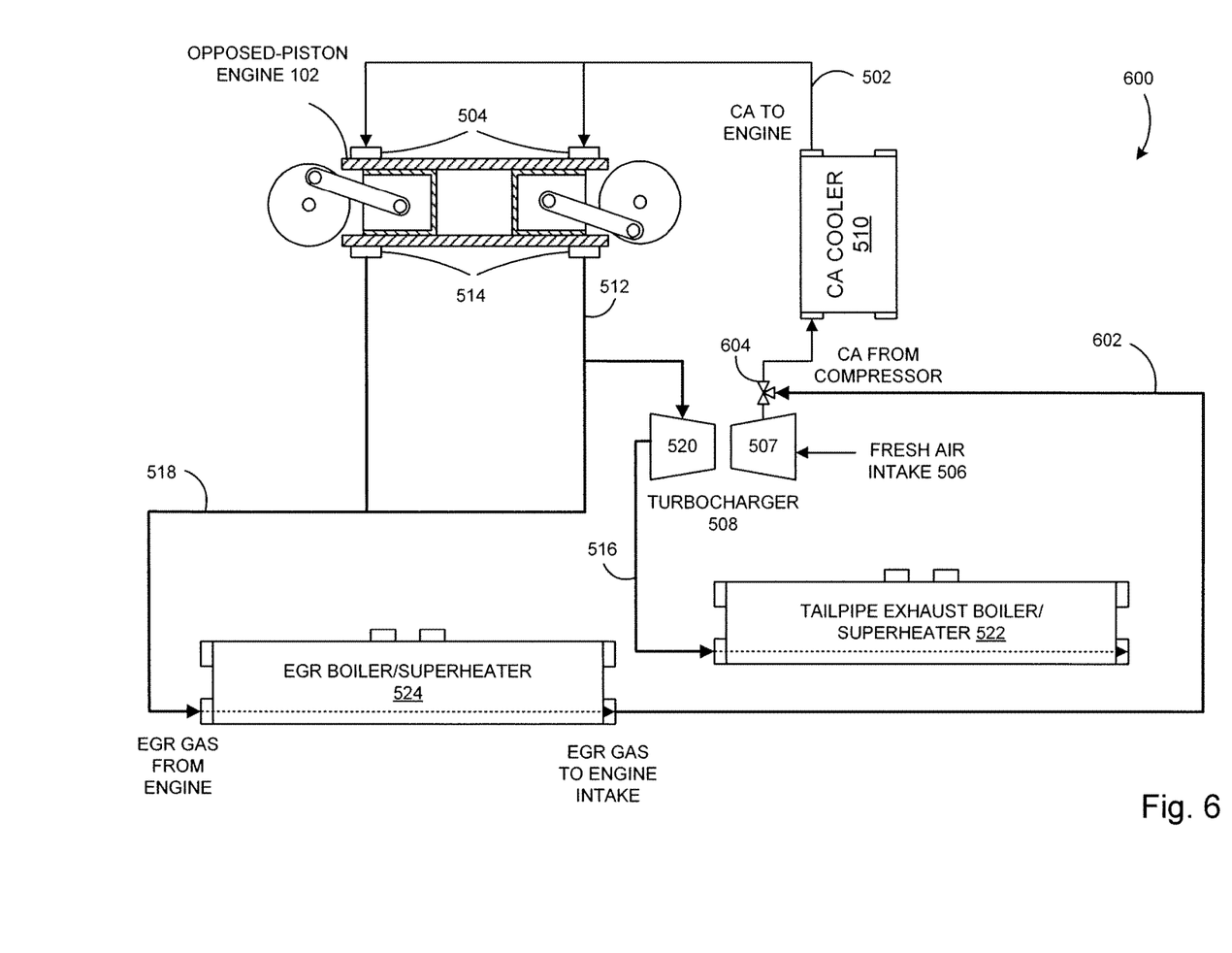
FIG. 6 is a block diagram illustrating exhaust gas and charge air routing of an engine system, according to another embodiment.

FIG. 6 is a block diagram illustrating exhaust gas and charge air routing of an engine system 600 according to another embodiment. The exhaust gas and charge air routing of the engine system 600 of FIG. 6 may be utilized in connection with any of the engine systems 100, 200, 300, and 400 of FIGS. 1-4, or with other engine systems. The engine system 600 of FIG. 6 is generally similar to the engine system 500 of FIG. 5, with a difference being that an EGR passage 602 of FIG. 6 fluidly couples the EGR boiler/superheater 524 to the intake passage 502 upstream of the charge air cooler 510, rather than downstream of the charge air cooler 510 as in the engine system 500 of FIG. 5. More specifically, a mixing valve 604 is positioned in the intake passage 502 downstream of the compressor 507 and upstream of the charge air cooler 510. The EGR passage 602 is fluidly coupled to the mixing valve 604 so as to mix the EGR gas from the EGR passage 602 with the fresh air from the fresh air intake 506. Accordingly, the charge air cooler 510 of the engine system 600 of FIG. 6 is structured to cool the EGR gas in addition to cooling the fresh air from the fresh air intake 506. The charge air cooler 510 of the engine system 600 of FIG. 6 may alternatively be referred to as a "charge cooler" because the charge air cooler 510 is also structured to cool the EGR gas, thereby effectively operating as both a charge air cooler and an EGR cooler.

While the present disclosure contains specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A system for waste heat recovery for an opposed-piston engine, comprising:
   an exhaust passage structured to fluidly couple to an exhaust manifold of the opposed-piston engine, the exhaust passage structured to receive exhaust gas from the opposed-piston engine;
   an engine cooling circuit comprising a first pump structured to circulate an engine cooling fluid through the opposed-piston engine and through a first boiler positioned downstream of the opposed-piston engine; and
   a waste heat recovery system, comprising:
      a working fluid circuit, comprising:
         a second pump structured to circulate a working fluid through the working fluid circuit;
         a first working fluid leg structured to transmit the working fluid through a recuperator and into the first boiler;
         a second working fluid leg structured to transmit the working fluid through the second boiler and into the first boiler;
         a second valve positioned along the working fluid circuit downstream of the condenser, the second valve structured to selectively direct the working fluid to at least one of the first working fluid leg and the second working fluid leg;
      the first boiler positioned along the working fluid circuit, the first boiler structured to transfer heat from the engine cooling fluid to the working fluid;
      a superheater positioned along the working fluid circuit downstream of the first boiler, the superheater fluidly coupled to the exhaust passage and structured to transfer heat from the exhaust gas to the working fluid;
      an expander positioned along the working fluid circuit downstream of the superheater, the expander structured to generate useful energy from the heat transferred to the working fluid from each of the exhaust gas and the engine cooling fluid;
      a condenser positioned along the working fluid circuit downstream of the expander and upstream of the first boiler; and
      a second boiler positioned along the working fluid circuit downstream of the condenser and upstream of the first boiler, the second boiler fluidly coupled to the superheater so as to receive the exhaust gas from the superheater, the second boiler structured to transfer heat from the exhaust gas to the working fluid.

2. The system of claim 1, wherein the engine cooling circuit further comprises:
   a radiator positioned downstream of the opposed-piston engine; and
   a first valve positioned downstream of the opposed-piston engine and upstream of each of the first boiler and the radiator, the first valve structured to block flow of the engine cooling fluid through the radiator in response to a temperature of the engine cooling fluid downstream of the opposed-piston engine being below a predetermined value.

3. The system of claim 2, wherein the first valve is structured to facilitate flow of the engine cooling fluid at least in part through the radiator in response to the temperature of the engine cooling fluid downstream of the opposed-piston engine being above the predetermined value.

4. The system of claim 1, wherein the exhaust passage includes an exhaust gas recirculation passage structured to divert at least a portion of the exhaust gas to an intake manifold of the opposed-piston engine, and wherein the superheater is fluidly coupled to the exhaust gas recirculation passage of the exhaust passage.

5. The system of claim 1, further comprising an exhaust gas recirculation cooler fluidly coupled to the exhaust gas recirculation passage, the exhaust gas recirculation cooler structured to cool the at least a portion of the exhaust gas from the exhaust gas recirculation passage.

6. A system for waste heat recovery for an opposed-piston engine, comprising:
   an exhaust passage structured to fluidly couple to an exhaust manifold of the opposed-piston engine, the exhaust passage structured to receive exhaust gas from the opposed-piston engine;
   an engine cooling circuit comprising a first pump structured to circulate an engine cooling fluid through the opposed-piston engine and through a first boiler positioned downstream of the opposed-piston engine;
   an intake passage structured to fluidly couple to an intake manifold of the opposed-piston engine, the intake passage structured to provide intake air to the opposed-piston engine;
   a waste heat recovery system, comprising:
      a working fluid circuit, comprising a second pump structured to circulate a working fluid through the working fluid circuit;

the first boiler positioned along the working fluid circuit, the first boiler structured to transfer heat from the engine cooling fluid to the working fluid;

a superheater positioned along the working fluid circuit downstream of the first boiler, the superheater fluidly coupled to the exhaust passage and structured to transfer heat from the exhaust gas to the working fluid;

an expander positioned along the working fluid circuit downstream of the superheater, the expander structured to generate useful energy from the heat transferred to the working fluid from each of the exhaust gas and the engine cooling fluid; and a charge air cooler positioned along the working fluid circuit upstream of the first boiler, the charge air cooler fluidly coupled to the intake passage, the charge air cooler structured to transfer heat from the intake air received from the intake passage to the working fluid.

7. The system of claim 6, wherein the exhaust passage includes an exhaust gas recirculation passage structured to divert at least a portion of the exhaust gas to the intake passage upstream of the charge air cooler, and wherein the charge air cooler is further structured to transfer heat from the at least a portion of the exhaust gas to the working fluid.

8. The system of claim 1, wherein the engine cooling fluid includes water.

9. The system of claim 1, wherein the engine cooling fluid includes a thermal oil.

10. A system for waste heat recovery for an opposed-piston engine, comprising:

an exhaust passage structured to fluidly couple to an exhaust manifold of the opposed-piston engine, the exhaust passage structured to receive exhaust gas from the opposed-piston engine; and a waste heat recovery system, comprising:

a working fluid circuit, comprising:

a pump structured to circulate a working fluid through the working fluid circuit, including through the opposed-piston engine, wherein, in operation, heat is transferred from the opposed-piston engine to the working fluid;

a second boiler positioned along the working fluid circuit downstream of the condenser and upstream of the opposed-piston engine, the second boiler fluidly coupled to the superheater so as to receive the exhaust gas from the superheater, the second boiler structured to transfer heat from the exhaust gas to the working fluid;

a superheater positioned along the working fluid circuit downstream of the opposed-piston engine, the superheater fluidly coupled to the exhaust passage and structured to transfer heat from the exhaust gas to the working fluid;

an expander positioned along the working fluid circuit downstream of the superheater, the expander structured to generate useful energy from the heat transferred to the working fluid from each of the exhaust gas and the opposed-piston engine; and a condenser positioned along the working fluid circuit downstream of the expander and upstream of the opposed-piston engine.

11. The system of claim 10, the working fluid circuit further comprising a first working fluid leg structured to transmit the working fluid through a recuperator and into the first boiler, a second working fluid leg structured to transmit the working fluid through the second boiler and into the first boiler, and a valve positioned along the working fluid circuit downstream of the condenser, the valve structured to selectively direct the working fluid to at least one of the first working fluid leg and the second working fluid leg.

12. The system of claim 10, wherein the exhaust passage comprises an exhaust gas recirculation passage structured to divert at least a portion of the exhaust gas to an intake manifold of the opposed-piston engine, and wherein the superheater is fluidly coupled to the exhaust gas recirculation passage of the exhaust passage.

13. The system of claim 10, further comprising an exhaust gas recirculation cooler fluidly coupled to the exhaust gas recirculation passage, the exhaust gas recirculation cooler structured to cool the at least a portion of the exhaust gas from the exhaust gas recirculation passage.

14. The system of claim 10, further comprising:

an intake passage structured to fluidly couple to an intake manifold of the opposed-piston engine, the intake passage structured to provide intake air to the opposed-piston engine, wherein the waste heat recovery system further comprises a charge air cooler positioned along the working fluid circuit upstream of the first boiler, the charge air cooler fluidly coupled to the intake passage, the charge air cooler structured to transfer heat from the intake air received from the intake passage to the working fluid.

15. The system of claim 14, wherein the exhaust passage includes an exhaust gas recirculation passage structured to divert at least a portion of the exhaust gas to the intake passage upstream of the charge air cooler, and wherein the charge air cooler is further structured to transfer heat from the at least a portion of the exhaust gas to the working fluid.

16. A system for waste heat recovery for an opposed-piston engine, comprising:

an engine cooling system comprising:

an engine cooling circuit comprising a first pump structured to circulate an engine cooling fluid through an opposed-piston engine;

an intake passage structured to fluidly couple to an intake manifold of the opposed-piston engine, the intake passage structured to provide intake air to the opposed-piston engine;

a first boiler positioned along the engine cooling circuit downstream of the opposed-piston engine;

a radiator positioned along the engine cooling circuit downstream of the opposed-piston engine; and a three-way valve positioned downstream of the opposed-piston engine and upstream of each of the first boiler and the radiator, the first valve structured to block flow of the engine cooling fluid through the radiator in response to a temperature of the engine cooling fluid downstream of the opposed-piston engine being below a predetermined value; and a waste heat recovery system, comprising:

a working fluid circuit, comprising a second pump structured to circulate a working fluid through the working fluid circuit;

the first boiler positioned along the working fluid circuit, the first boiler structured to transfer heat from the engine cooling fluid to the working fluid; and a charge air cooler positioned along the working fluid circuit upstream of the first boiler, the charge air cooler fluidly coupled to the intake passage, the charge air cooler structured to transfer heat from the intake air received from the intake passage to the working fluid.

17. The system of claim 16, wherein the first valve is structured to facilitate flow of the engine cooling fluid at least in part through the radiator in response to the temperature of the engine cooling fluid downstream of the opposed-piston engine being above the predetermined value.

\* \* \* \* \*